Oct. 27, 1970 H. SMITH 3,537,043
LIGHTWEIGHT MICROWAVE COMPONENTS AND WAVE GUIDES
Filed Aug. 6, 1968 2 Sheets-Sheet 2
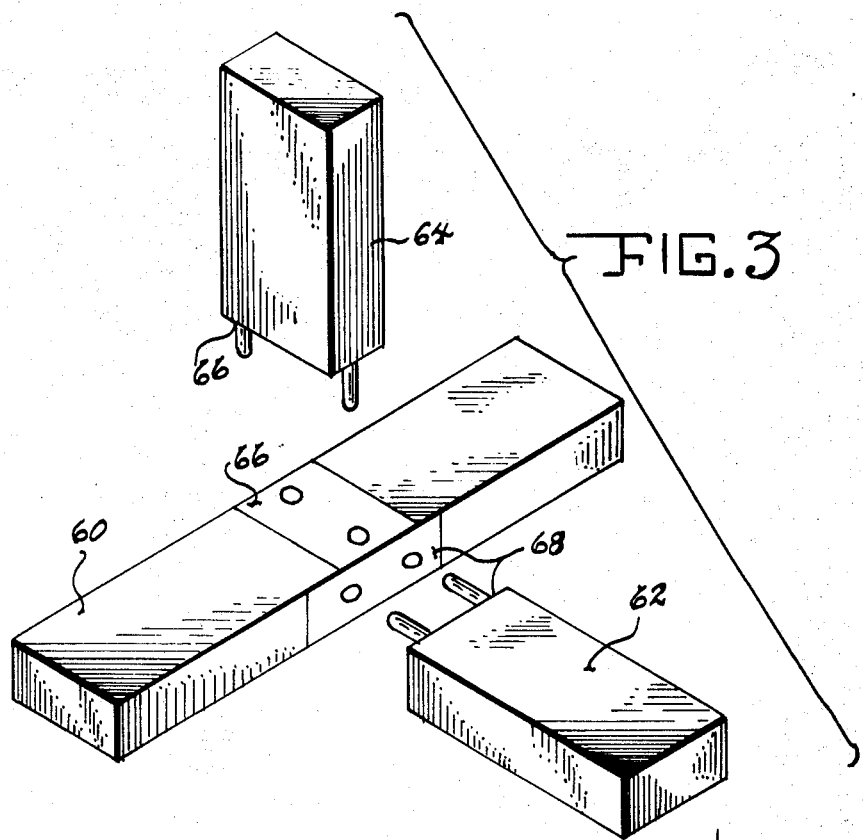
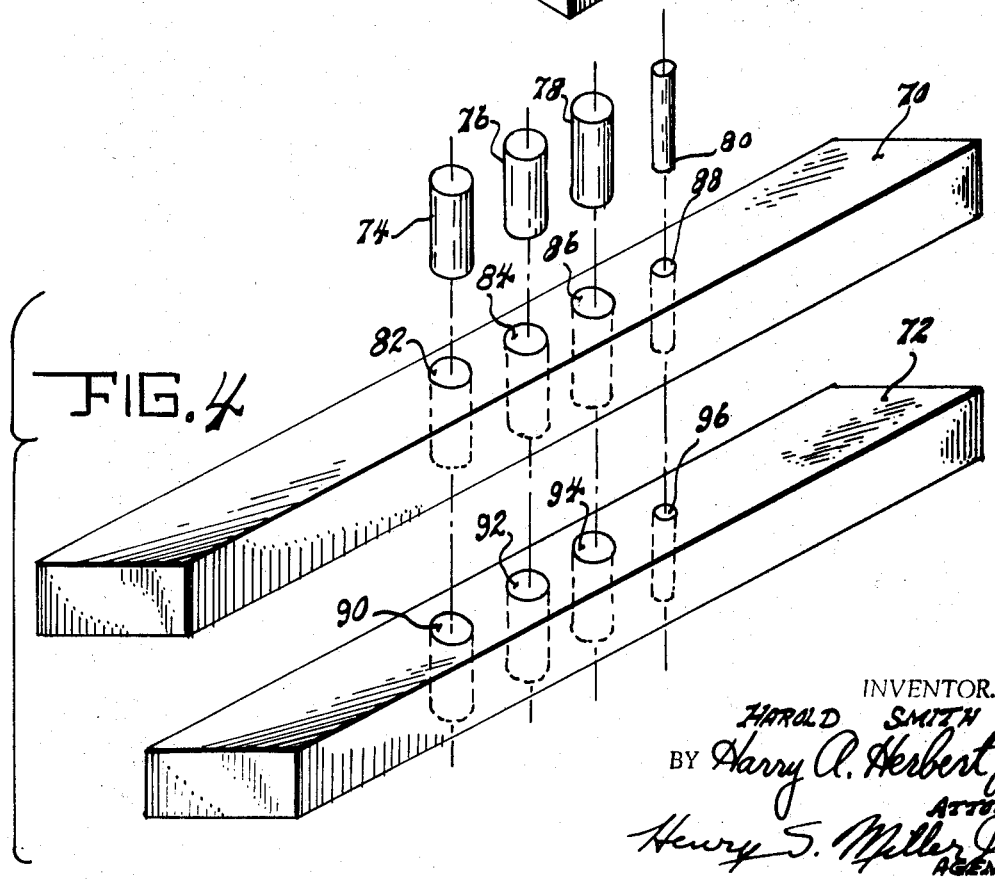
INVENTOR.
HAROLD SMITH
BY Harry A. Herbert Jr.
ATTORNEY
Henry S. Miller Jr.
AGENT United States Patent Office 3,537,043
Patented Oct. 27, 1970

3,537,043
LIGHTWEIGHT MICROWAVE COMPONENTS AND WAVE GUIDES
Harold Smith, Severna Park, Md., assignor, by mesne assignments, to the United States of America as represented by the Secretary of the Air Force
Filed Aug. 6, 1968, Ser. No. 750,737
Int. Cl. H01p 3/12
U.S. Cl. 333—95                    2 Claims

ABSTRACT OF THE DISCLOSURE

Super lightweight wave guides including dielectric materials coated with highly conductive material and joined with "mortise" and "butt" joints after which the joints are coated with a conductive epoxy resin.

BACKGROUND OF THE INVENTION

This invention relates generally to the fabrication of electronic equipment and more specifically to the fabrication of microwave components and wave guides.

Generally, a microwave system consists of a source of microwave energy which is coupled in any one of a variety of ways into wave guide where it is directed to an antenna and radiated. On the other end, the energy is received by antenna, sent along a wave guide to a receiver, where it is coupled out and utilized. It is understood that there are a vast number of other applications of microwave energy, this only serving to provide an illustration for the purposes of showing one area where the instant invention might be applicable.

The majority of prior art wave guides consist of an evacuated structure either in the form of a tube or of a rectilinear configuration. Sometimes the wave guide is filled with a gas and sometimes it is not.

The wave guides described thus far have a problem not only in that they in themselves are heavy and bulky but, when it is necessary to connect segments of wave guides together, it is necessary to use large flanges which abut and are then bolted together. In the case of tubular wave guides, a form of pipe fitting is used.

In order to reduce the weight and, to some extent, the bulk of wave guides, it was found that by plating selected dielectric substrates with a highly conductive metal it was possible to substantially reduce their weight.

However, another problem arose in that the plating facilities available and within a reasonable cost to build were too small to make the lengths of wave guide necessary for the concept to be practical. The largest known facility available in industry and government is only the order of twenty-four inches. It can readily be seen then that in the case of long wave guide runs it is necessary to connect a series of sections together, each with its flanges, thereby adding to the weight and bulk of the system.

The instant invention solves the problem of the prior art by providing a substitute method and means for connecting sections of dielectric plated wave guide without the use of flanges or pipe type fittings.

SUMMARY OF THE INVENTION

This invention includes means for joining wave guides generally and, more specifically, a means and method for joining solid dielectric wave guides without the need for standard wave guide fittings.

This invention, by applying a concept of considerable vintage, has provided the electronics art with a totally new and unexpected means for joining long lengths of conductor coated dielectric wave guides. Because of the novelty contained in this invention, the wave guides joined and connected in the manner about to be described may be termed "super lightweight" because of their decreased size and small mass.

The concept of this invention involves the utilization of joining techniques used in the art of carpentry and applying them to solid wave guides in a manner which shows no deterioration in electrical performance over the prior art.

It is, therefore, an object of this invention to provide a new and improved means for joining dielectric wave guides.

It is another object of this invention to provide a new and improved method for joining dielectric coated wave guides.

It is a further object of this invention to provide a method and means for joining wave guide components that are lighter than any hitherto known.

It is still another object of this invention to provide a method and means for joining wave guides that are less expensive than any hitherto known.

It is still a further object of this invention to provide a method and means for joining wave guide sections which are less bulky than those of the prior art.

These and other advantages, features and objects of the invention will become more apparent from the description taken in connection with the illustrative embodiments in the accompanying drawings.

DESCRIPTION OF THE DRAWINGS

FIG. 3 is an expanded view of three wave guides joined together in a "magic tee" utilizing butt joints.

FIG. 4 is an expanded view of a solid dielectric directional coupler utilizing dowel pins as coupling elements.

DESCRIPTION OF THE INVENTION

Figure 1:
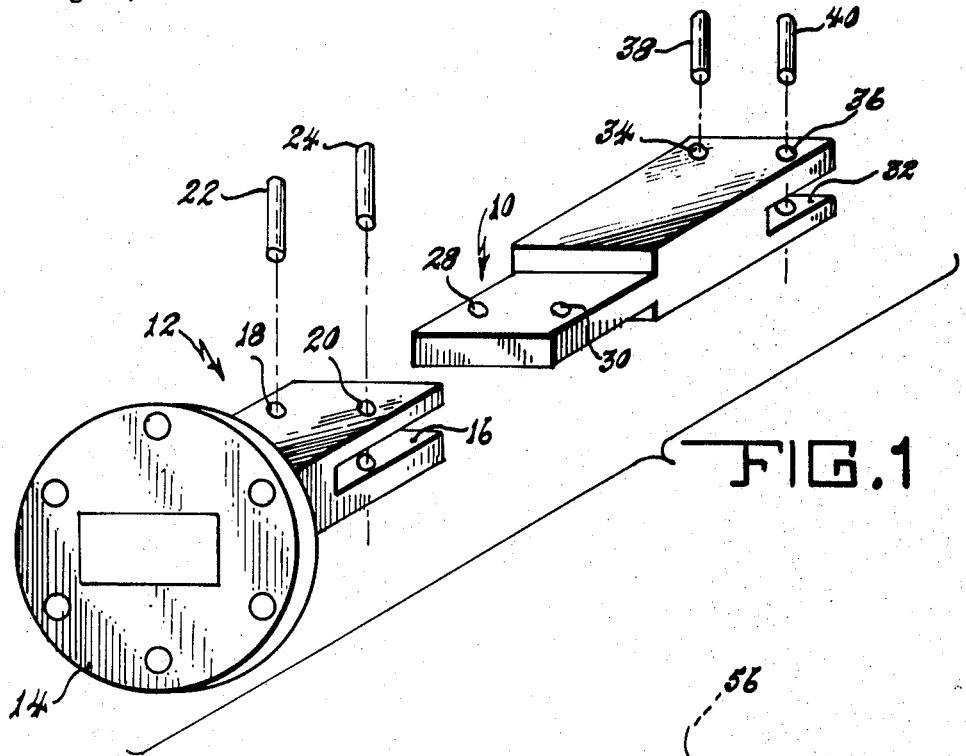
FIG. 1 is an expanded view of a dielectric wave guide having a mortise joint.

Referring now to FIG. 1, there are shown generally two sections of wave guides 10 and 12. The wave guides are constructed from low-loss dielectric material to minimize attenuation losses. Such materials include but are not limited to Teflon, polystyrene or Plexiglas. These dielectrics are subsequently coated or plated with a highly conductive material which is usually copper, although aluminum or other metals would be reasonable as substitutes. Section 12 is shown having a conventional flange 14 at one end and would be utilized either in connection with a prior art type section of wave guide or with an appropriate piece of microwave producing or receiving equipment. The opposite end of section 12 has a rectangular groove 16 formed in the center along the longitudinal axis of the section. Transverse to the groove are a pair of holes 18 and 20 which extend through the wave guide and accept a pair of tight fitting dielectric dowel pins 22 and 24.

The mating section of wave guide 10 has an extension of reduced thickness 26 which mates with the groove 16. Holes 28 and 30 mate with the holes 18 and 20, and receive the dowel pins 22 and 24. The contacting surfaces of the wave guide sections are not coated while the exposed surfaces retain the coating.

The opposite end of the section 10 is identical to section 12 having a groove 32, holes 34 and 36 and dielectric dowel pins 38 and 40 to allow the mating of another section of wave guide. This type of connection, when used in nonanalogous fields of art, is frequently called a "mortise joint" and has proved to be very reliable.

Figure 2:
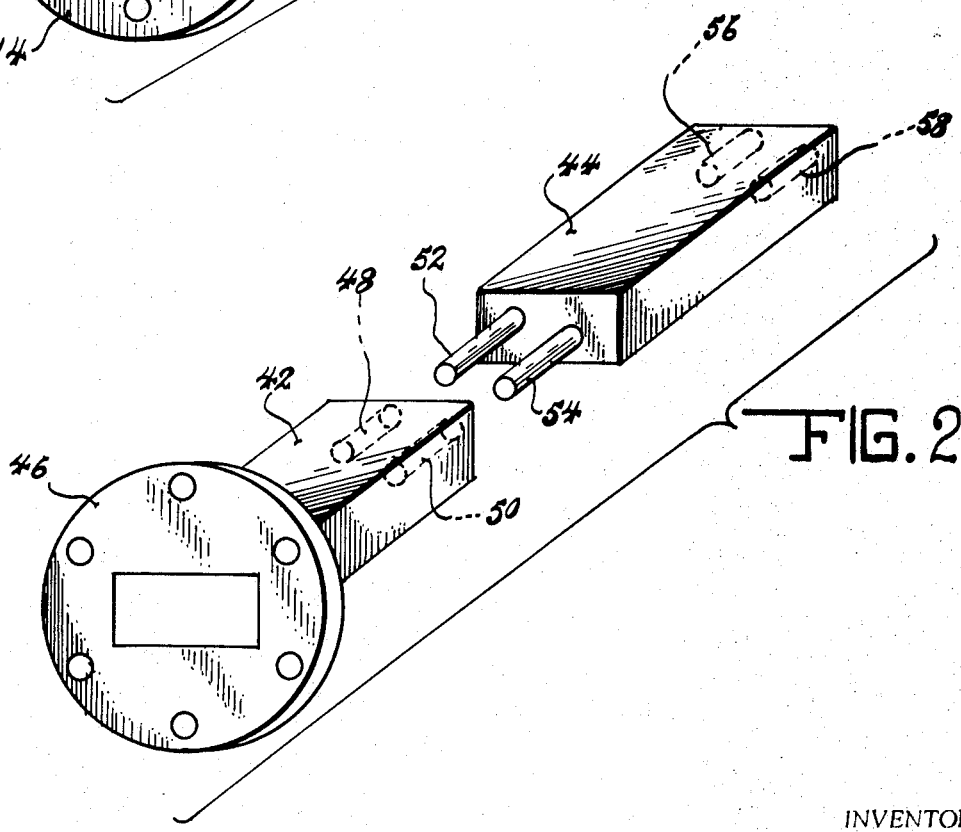
FIG. 2 is an expanded view of a dielectric wave guide guide having a butt joint.

Sections 42 and 44 of the wave guide are shown in FIG. 2. A conventional flange 46 is at one end of section 42, while the opposite end has two holes 48 and 50 bored in the dielectric parallel to its longitudinal axis. Pins 52 and 54 extend from section 44 and form a tight press fit in the holes 48 and 50. The mating surfaces here likewise have no conductive coating. The remote end of section 44 has a pair of holes 56 and 58 bored therein for receiving another section of wave guide. This type of connection is referred to as a "butt joint."

FIG. 3 illustrates an example of the utility of this invention wherein a so-called "magic tee" is formed of three sections of wave guide 60, 62 and 64 joined together with "butt" joints 66 and 68. In the prior art, this type of connection required an immense amount of plumbing and as a result was heavy and extremely bulky. The "magic tee," using the concepts of this invention, is free of all external appendages of any type and may truly be called "super lightweight."

A directional coupler such as could be utilized in the "S" band is provided in FIG. 4. The dielectric wave guides 20 and 22 are in place side by side and connected by inserting the dielectric pins 74 to 80 through the holes 82 to 88 in section 70 and 90 to 96 in section 72, whereby the microwave signals are coupled from one section to the other by the dielectric pins acting as coupling elements. This arrangement has proved to be a very effective weight reducing arrangement.

The joints disclosed in this invention and, in particular, those shown in FIGS. 1 and 2 are coated with a conducting epoxy resin after they have been assembled to provide an apparatus certainly as sturdy and reliable as its metal flanged counterpart of the prior art.

Having thus disclosed a new and novel combination in microwaveguides and in the methods of joining sections of these devices, I claim my invention in the claims which follow.

1. A structure for channeling ultra high-frequency electromagnetic waves comprising: an elongated rectangularly shaped structure of low-loss dielectric material, having a coating of a highly conductive material on at least one surface thereof; one end of the structure being of reduced dimensions and forming an extension of the structure and adapted to engage a mating structure; the other end of the structure having a groove like recess, similar in size and dimension to the said extension, and adapted to receive the extension from a similar mating structure, and means associated with said extension and said groove for affixing a plurality of similar structures in series.

2. A structure for channeling ultra high-frequency electromagnetic waves comprising: an elongated rectangularly shaped structure of low-loss dielectric material, having a coating of highly conductive material on at least one surface thereof; one end of said structure having at least one male extension of extended cylindrical shape adapted to be mated in an abutting structure having a receiving means of the same shape and dimension; the other end of said structure having at least one extended cylindrically shaped opening similar in size and dimension to said extension and adapted to receive the extension from a similar mating structure.

References Cited

UNITED STATES PATENTS 3,210,695  10/1965  Washecka _____ 333—95 X
3,315,187   4/1967  Nakahara _____ 333—95

HERMAN KARL SAALBACH, Primary Examiner

S. CHATMON, JR., Assistant Examiner

U.S. Cl. X.R.

174—35; 333—97; 287—64, 20.92